(12) United States Patent
Lutz

(10) Patent No.: US 8,717,582 B2
(45) Date of Patent: May 6, 2014

(54) SENSOR APPARATUS FOR DETECTING AN OVERHANG ON THE LOAD OF A CARRIER DEVICE

(71) Applicant: CEDES Safety & Automation AG, Landquart (CH)

(72) Inventor: Eric Lutz, Vilters (CH)

(73) Assignee: Cedes Safety & Automation AG, Landquart (CH)

( * ) Notice: Subject to any disclaimer, the term of this patent is extended or adjusted under 35 U.S.C. 154(b) by 0 days.

(21) Appl. No.: 14/042,853

(22) Filed: Oct. 1, 2013

(65) Prior Publication Data

US 2014/0028836 A1 Jan. 30, 2014

Related U.S. Application Data

(63) Continuation of application No. 12/298,794, filed as application No. PCT/EP2006/007825 on Aug. 8, 2006, now Pat. No. 8,564,791.

(30) Foreign Application Priority Data

Aug. 9, 2005 (DE) .................. 10 2005 038 019

(51) Int. Cl.
*G01B 11/24* (2006.01)

(52) U.S. Cl.
USPC ....... 356/621; 356/638; 250/559.29; 250/224

(58) Field of Classification Search
USPC .................................. 356/614–640
See application file for complete search history.

(56) References Cited

U.S. PATENT DOCUMENTS

| 3,822,766 | A | 7/1974 | Suter |
| 4,753,668 | A | 6/1988 | Honjo et al. |
| 5,567,102 | A | 10/1996 | Tanaka |
| 5,785,482 | A | 7/1998 | Tanaka |
| 6,239,423 | B1 | 5/2001 | Hama et al. |
| 6,879,407 | B2 | 4/2005 | Inoue et al. |
| 7,034,280 | B2 | 4/2006 | Beck et al. |
| 2003/0065421 | A1 | 4/2003 | Didriksen et al. |
| 2003/0146373 | A1 | 8/2003 | Kudo et al. |
| 2004/0021877 | A1 | 2/2004 | Clark |
| 2005/0231734 | A1 | 10/2005 | Johannesson et al. |

FOREIGN PATENT DOCUMENTS

| DE | 119999 | 5/1976 |
| DE | 22 36 424 C3 | 7/1982 |
| DE | 37 32 842 A1 | 4/1988 |
| DE | 91 14 867 U1 | 3/1992 |

(Continued)

OTHER PUBLICATIONS

International Search Report for PCT/EP2006/007825; date of mafling Oct. 31, 2006.

*Primary Examiner* — Gregory J Toatley
*Assistant Examiner* — Rebecca C Bryant
(74) *Attorney, Agent, or Firm* — Boyle Fredrickson, S.C.

(57) ABSTRACT

A sensor apparatus for detecting an overhang on a load of a carrier device, having a sensor arrangement with at least one transmitter and a receiver and also an electronic unit for control purposes. According to the invention, the sensor arrangement senses two regions of the carrier device with a load during a movement of the carrier device such that evaluation of the geometrical position of the regions in relation to one another is made possible, wherein the first region relates to the carrier device and the second region relates to the load. Furthermore, the electronic unit is designed for generating a signal for each region and linking the signals such that it is possible to ascertain an overhang from this.

17 Claims, 6 Drawing Sheets

(56) References Cited

FOREIGN PATENT DOCUMENTS

| | | |
|---|---|---|
| DE | 298 13 898 | 1/2000 |
| DE | 19946476 A1 | 3/2001 |
| DE | 102 12 382 A1 | 10/2002 |
| DE | 103 29 881 A1 | 1/2005 |
| DE | 103 39 499 A1 | 4/2005 |
| EP | 0 964 273 A2 | 12/1999 |
| JP | 2000-255754 A1 | 9/2000 |
| WO | 93/23318 | 11/1993 |
| WO | 2004/074769 A2 | 9/2004 |

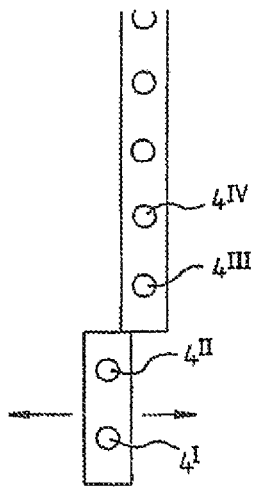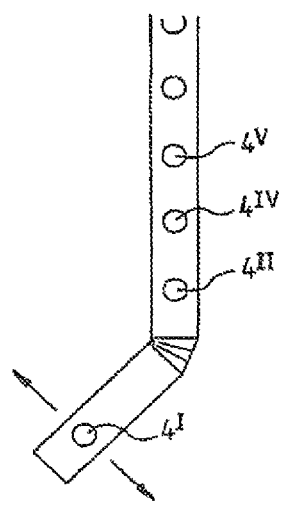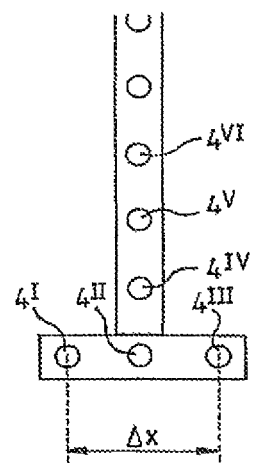
Fig. 14   Fig. 15   Fig. 16
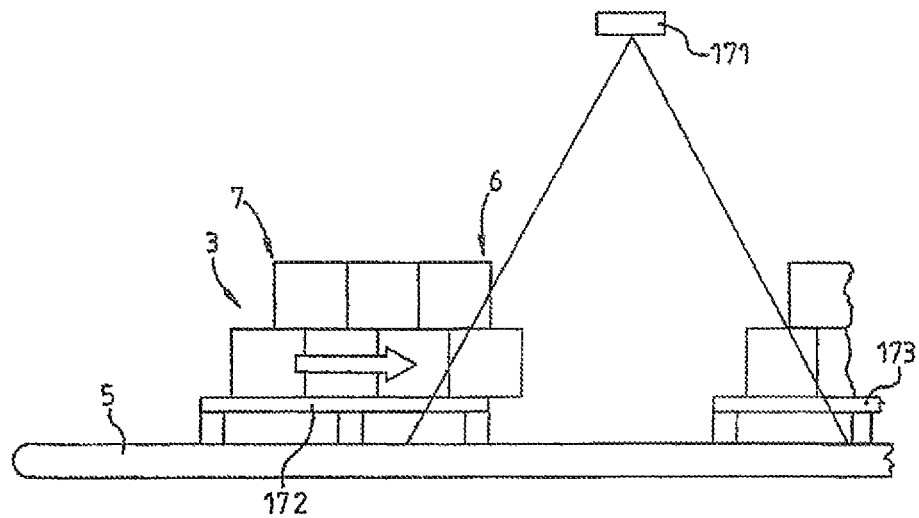
Fig. 17

SENSOR APPARATUS FOR DETECTING AN OVERHANG ON THE LOAD OF A CARRIER DEVICE

CROSS-REFERENCE TO RELATED APPLICATIONS

This application is a continuation application and claims the benefit of U.S. patent application Ser. No. 12/298,794, filed Apr. 9, 2009, the entire contents of which is incorporated herein by reference.

FIELD OF THE INVENTION

The invention relates to a sensor apparatus for detecting an overhanging load on a carrier device.

BACKGROUND OF THE INVENTION

When material is being moved on a transporting system, it is often necessary to ensure that the material does not overhang or project beyond a front edge, and also a rear edge, of a transporting structure. An overhang can cause serious problems in an automatic storing system. If, for example, there is an overhang on a pallet and it is being transported to a position in a store, the pallet with the load may not fit into the storing location because of the overhang. The overhang may also cause a collision with structures of the storing system to take place. Such situations are to be avoided, since they effect productivity and cause damage to the load, or possibly the storing or transporting system.

In a known embodiment, for example, a pallet is stopped in a predefined position or a sensor with which the pallet can be detected, in order for its movement then to be stopped, is used. A light curtain with light barriers is provided a little away from the front edge of the pallet. When the output of the light curtain indicates an interruption of the light barriers, an overhang of material is protruding beyond the front edge of the pallet. The output of the light curtain can then be used to remove the pallet from the storing operation or to output a warning about the problem to the operating personnel.

A corresponding procedure can be used, not only for the front edge of the pallet, but for its rear edge also. If the pallet is arranged in such a way that the light curtain is positioned just behind the rear edge of the pallet, it can be established with the light curtain whether something is overhanging beyond the rear edge of the pallet.

In the case of one embodiment, the storing operation is only continued when both tests have been completed and the light curtain has not been interrupted in either test.

The test for the presence of an overhang accordingly requires a certain amount of time, by which the storing operation is prolonged.

SUMMARY OF THE INVENTION

The invention is based on the object of providing a sensor apparatus for detecting an overhang that operates more effectively.

The invention is based on a sensor apparatus for detecting an overhanging load on a carrier device, for example a pallet, which comprises a sensor arrangement with at least one transmitter and a receiver and also an electronic unit for controlling the transmitter and receiver.

The essence of the invention is that the sensor arrangement senses two regions of the carrier device with a load during a movement of the carrier device such that evaluation of the geometrical position of the regions in relation to one another is made possible, wherein the first region relates to the carrier device and the second region relates to the load, and the electronic unit is designed for generating a signal for each region and linking the signals such that it is possible to ascertain an overhang from this.

This procedure is initially based on the idea that the signals necessary for determining the overhang are sensed during the movement of the pallet. As a result, the "overhang detection" does not cause any time loss. Another central point of the procedure according to the invention is the concentration of the sensing of two regions, namely the region of the carrier device and the region of the load. In the simplest case, the evaluation can consequently confine itself to two signals for the two regions, allowing the electronic unit to be of a comparatively simple design.

In a further particularly preferred refinement of the invention, the electronic unit is designed to generate a single signal for each region and ascertain an overhang by performing a logical linking operation if a signal that does not signify a carrier device is generated for the first region and a signal that signifies a load is generated for the second region. If, for example, a load but no carrier device is detected at a location that corresponds to a plane perpendicular to the direction of movement of the carrier device, there must be an overhang of the load beyond the carrier device in the direction of movement.

In a refinement of the invention that is preferred moreover, the sensor arrangement comprises a light barrier arrangement with a number of light barriers, wherein the light barriers are assigned to the first and second regions, so that at least one light barrier in the first region is provided for the detection of a carrier device and at least one light barrier in the second region is provided for the detection of a load. There are preferably a number of light barriers present for the region of the load in particular, possibly also for the region of the carrier device.

To avoid an overhang being falsely detected, because a light barrier is positioned on the carrier device in the form of a pallet at a location at which the pallet is open because of its structural design or because of damage to the pallet detection in a direction or a direction transverse to the direction of movement, and a corresponding light barrier is not interrupted, the following procedure may be followed:

At least one light barrier is arranged at a height of the carrier device at which there is, for example, a continuous deck layer for the provision of a carrier device support. This avoids a situation in which, for example, measuring is carried out with a light barrier in a foot or base region of the carrier device, for example a pallet, where there is a clearance at various points.

The light barriers are preferably positioned transversely to the direction of movement of the carrier device in such a way that the detection beam runs parallel to the carrier device support.

However, in order that projecting parts of the load that have a smaller thickness than the distance between the light barriers or elements of the carrier device that likewise have a smaller thickness than the distance between the respective light barriers sensed, it is preferred to provide in one or both of the regions with at least one light barrier that runs obliquely in respect to a carrier device support, that is to say at an angle in relation to a corresponding plane of support.

In order to be able to detect an overhang reliably, it should however be ensured that an oblique arrangement of light barriers is respectively only provided in one of the regions, the load or the transporting structure, and not between the regions.

Furthermore, it is advantageous if the presence or absence of an overhang can be determined by means of the electronic unit from a time difference between a signal of the first region and a signal of the second region, by using a speed of movement of the carrier device. The overhang can be determined comparatively from the time difference and the speed, so that differentiation between an overhang that is still allowed and an overhang that is not allowed is possible. A corresponding evaluation of signals does not have to be performed immediately at the point in time that the signals are sensed, but may also be carried out at a later point in time. This is so because it is often immaterial for the detection of an overhang, if such an overhang is present, whether the carrier device, for example a pallet, is stopped several centimeters or even meters after a light curtain of light barriers, for example, if the overhang is ascertained from the evaluation of the signals.

Furthermore, it is preferred for the electronic unit to be designed for first sensing the second region of the load and then the first region of the pallet. For example, the light barriers for the second region are scanned first, and then a scan of the light barriers for the second region is performed. In a scan, the light barriers are preferably interrogated sequentially. This has the advantage that it is possible to avoid a situation in which, when the carrier device with a load is moving, no carrier device has been detected at a particular time in the first region, but at the next moment the continued movement causes the load to be detected in the second region of light barriers and then interpreted as an overhang. This applies to the determination of a front flank of a carrier device and load. For the rear flank of a carrier device and, load, it is preferred if the first region is scanned first and then the second region.

To avoid misinterpretation of the respective signal from the first and second regions on account of movement of the carrier device with a load, it is proposed that the electronic unit is formed for sensing the first and second regions at least twice. A second "full scan" is interpreted as a kind of "confirmation scan", after which a corresponding output signal for an overhang is generated if the overhang signal of the first scan is confirmed in the second scan. Possibly a whole series of scans are carried out.

Another possible way of avoiding misinterpretations may be to design the electronic unit in such a way that the signals for the first and second regions are shifted in time in relation to one another. For example, in the case of a front flank or an arriving front, the signal of the second region is shifted forward and, for a rear flank or a departing front, the signal of the second region is shifted back with respect to the first region. As a result, on the basis of the time shift, a certain overhang can be allowed, both at the front flank and at the rear flank of a carrier device, or that an overhang signal is merely due to a delayed measurement and an overhang can be ruled out.

A corresponding time shift can also be achieved not by shifting the signals in time but by the light barriers of the first region and the second region being arranged geometrically offset in relation to one another with respect to a direction of movement of the carrier device.

In a refinement of the invention that is preferred moreover, the sensor arrangement comprises a 3D camera. With this camera, the first and second regions both of the arriving front and of the departing front of a carrier device with a load can be set geometrically in relation to one another to determine the presence or absence of overhang from them.

In a further advantageous refinement of the invention, the sensor arrangement comprises a sensor which operates on the time-of-flight principle, wherein a transmitter and receiver for electromagnetic radiation, in particular light, preferably infrared light, are provided and the electronic unit is formed for determining a distance covered by the electromagnetic radiation emitted by the transmitter to the receiver via a reflection surface by an evaluation of a phase of an oscillation modulated onto the electromagnetic radiation. With this type of distance measurement, the distance from the first region and the second region can be determined, so that an overhang can be calculated from this. In a similar variant, the sensor arrangement determines a distance covered by an electromagnetic radiation, in particular light, from the transmitter to the receiver via a reflection surface, by means of an evaluation of the time difference between when the electromagnetic radiation is transmitted and when it is received back.

BRIEF DESCRIPTION OF THE DRAWINGS

A number of exemplary embodiments are explained in more detail in the drawings, with further advantages and details being specified.

In the drawings:

FIGS. 14 to 16 show geometrically differently designed side parts of light barrier apparatuses, in a schematic side view, and FIG. 17 shows the arrangement of a 3D camera for monitoring a front flank and a rear flank of a loaded pallet, in a schematic side view.

DETAILED DESCRIPTION OF THE INVENTION

Figure 1:
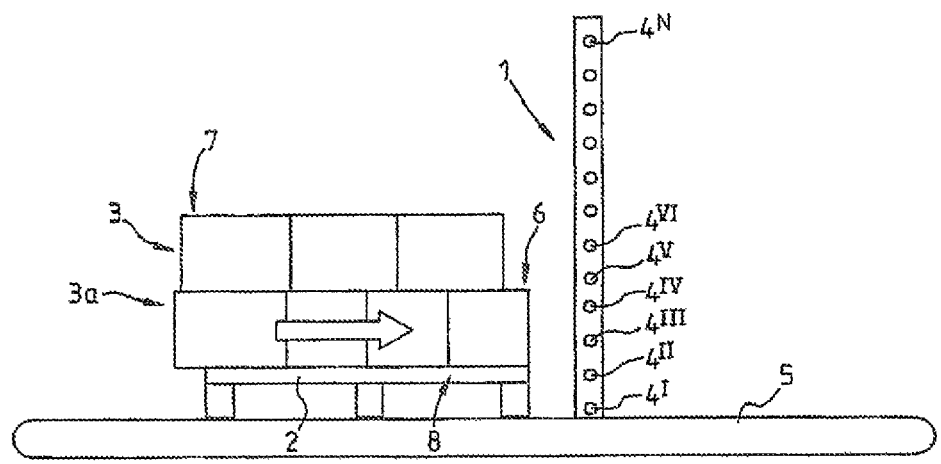
FIG. 1 shows a light barrier apparatus with a loaded pallet to be moved on it, in a schematic side view.

A light barrier apparatus 1 with which an overhang 3a of a load 3 on a pallet 2 can be detected is represented in FIG. 1. The pallet 2 moves on a conveying device 5 through the light barrier apparatus 1, for example to a storing location (not represented).

Figure 7:
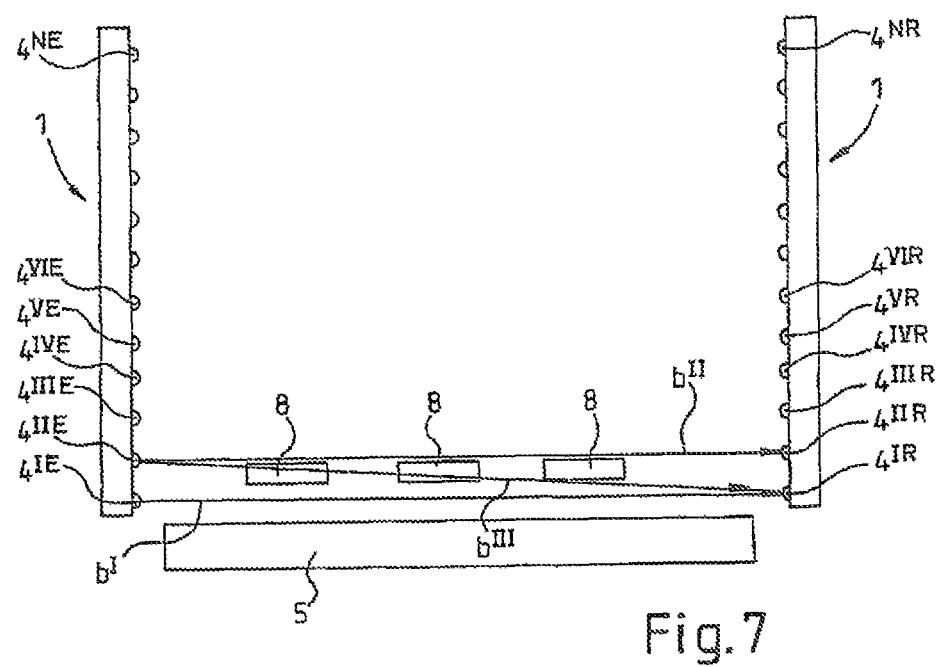
FIG. 7 shows the schematic frontal representation of FIG. 5, with a light barrier apparatus with an obliquely operating light barrier.

The light barrier apparatus 1 comprises a multiplicity of light barriers $4^I$ to $4^N$, which respectively comprise a transmitter $4^{IE}$-$4^{NE}$ and a receiver $4^{IR}$-$4^{NR}$ (see in particular FIG. 7). According to the invention, the light barriers $4^I$ to $4^N$ of the light barrier apparatus 1 are subdivided into two groups. A first group comprises light barriers $4^I$, $4^{II}$ that are arranged at the same height as the pallet 2. The second group comprises all the other light barriers $4^{III}$-$4^N$ (see FIG. 1). An output of the light barrier apparatus is activated when at least one light barrier of the second group is interrupted while the light barriers $4^I$, $4^{II}$ of the first group are not blocked. The activated output consequently stands for the detection of an overhang.

If the pallet 2 runs into the light barrier apparatus 1, the light barriers $4^I$-$4^{IV}$ are interrupted without the pallet stopping. Since the light barriers $4^{III}$ and $4^{IV}$ in the second group together with the light barriers $4^I$ and $4^{II}$ of the first group are interrupted, the light barrier apparatus 1 initially does not provide an output signal that signals the detection of an overhang.

The light barrier apparatus also preferably comprises software that allows it to be established which light barrier is interrupted. It can be determined which light barrier belongs to which group of light barriers by a configuration element, for example a PC, a notebook, a PDA, a remote control or the like (not represented). As soon as the output of the light barrier apparatus 1 is activated, a signal that can be used for example for stopping the movement of the conveying device 5, and subsequently the load of pallet 2 is available. This is the case for example if a rear edge 7 of the load 3 reaches the light barrier apparatus 1 according to FIG. 1. There, the light barriers $4^{III}$ to $4^{VI}$ are interrupted, while the light barriers $4^I$, $4^{II}$ for the pallet 2 are not interrupted, over a period or phase of the movement.

According to the invention, this has the effect that the output is activated.

Figure 2:
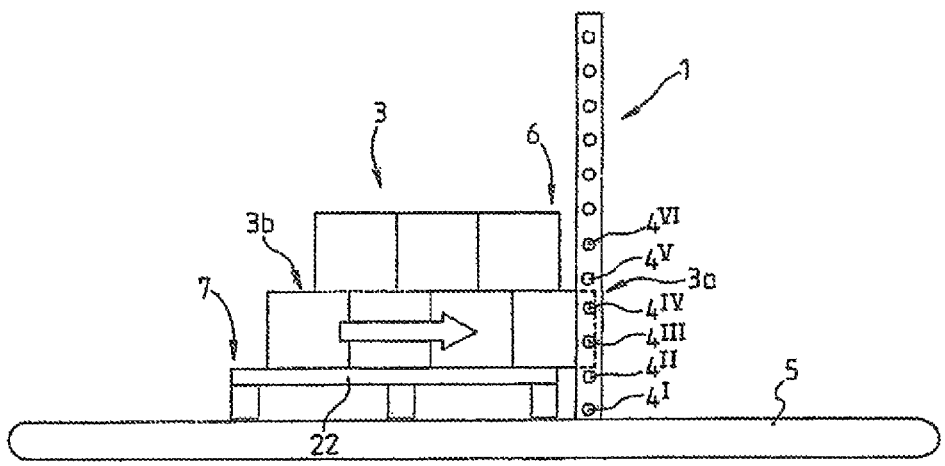
FIG. 2 shows a diagram corresponding to FIG. 1, but with a differently loaded pallet, in which the load is already reaching into the light barrier apparatus.

A second pallet 22, which moves on the conveying device 5 in the direction of the light barrier apparatus 1, is represented in FIG. 2. The pallet 22 transports boxes 3b through the light barrier apparatus 1. Without stopping the pallet 22, the light barriers $4^{III}$, $4^{IV}$ of the second group are interrupted. Since light barriers of the first group are not interrupted, the output of the light barrier apparatus 1 is activated. The output signal may be used for stopping the movement of the pallet 22 and/or warning an operator about an overhang of the load 3.

Figure 3:
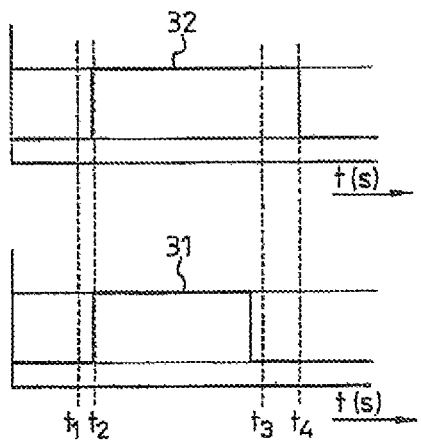
FIGS. 3 and 4 show a light barrier signal progression for the light barrier apparatuses according to FIGS. 1 and 2 for a complete run of a pallet with a load through the light barrier apparatus, FIGS. 5 and 6 respectively show a further pallet before a light barrier apparatus in a schematic side view corresponding to FIGS. 1 and 2.

A signal progression 31 for the first group of light barriers and, a signal progression 32 for the second group of light barriers are represented in FIG. 3 for a run of a pallet according to FIG. 1 through the light barrier apparatus 1. The signals represent an OR operation of all the light barriers of the respective group.

At $t_1$, both groups of light barriers are uninterrupted. Therefore, no overhang is detected. At $t_2$, both groups of light barriers are interrupted simultaneously, as a result of which likewise no overhang is established. At $t_3$, the first group of light barriers is no longer interrupted, but light barriers $4^{III}$ and $4^V$ of the second group are. This is interpreted as an overhang of the rear edge 7 (see FIG. 1, which activates the output of the light barrier apparatus 1.

Figure 4:
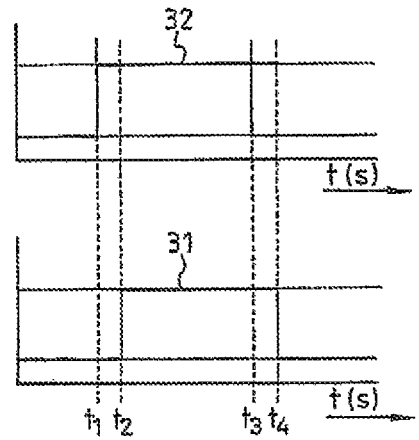

The signal progressions 31, 32 of the first and second groups for the case where the pallet 22 according to FIG. 2 runs through the light barrier apparatus 1 are represented in FIG. 4.

At $t_1$, a light barrier of the second group is interrupted while no light barrier of the first group is interrupted, which indicates an overhang at the front edge 6 of the load.

At $t_4$, only the first group is interrupted, as a result of which it is indicated that there is no overhang at the rear edge of the pallet 22.

In the table below, the status of the output of the light barrier apparatus in dependence on the signal of the first and second groups of light barriers is represented.

| Group of light barriers 1 | Group of light barriers 2 | Output |
|---|---|---|
| 1 | 1 | 0 |
| 1 | 0 | 0 |
| 0 | 1 | 1 |
| 0 | 0 | 0 |

Figure 5:
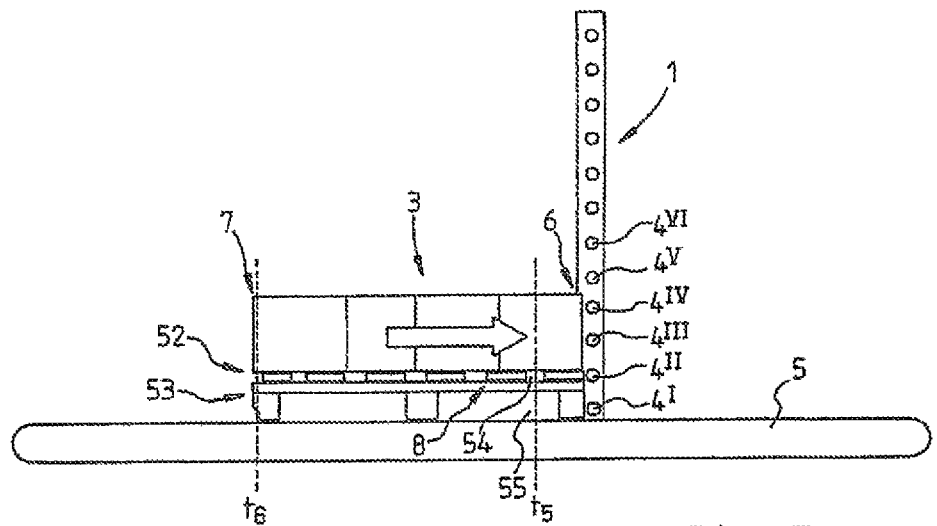

The basic principle is comparatively simple, but in reality special cases occur, and are shown in FIG. 5.

A pallet 52 that is damaged at the rear edge 53 and has a set-back profile is represented in FIG. 5. Furthermore, there are gaps 54, 55 in the extent of the pallet 52.

This has the consequence that, at the location $t_5$, the second group of light barriers is interrupted while the first group of light barriers is not interrupted, as a result of which the output is activated in accordance with the table above. This is so because the gaps 54, 55 allow the light barriers $4^I$ and $4^{II}$ to pass through the pallet 52.

There are several possible ways of preventing resultant unwanted stopping of the pallet 52.

Figure 6:
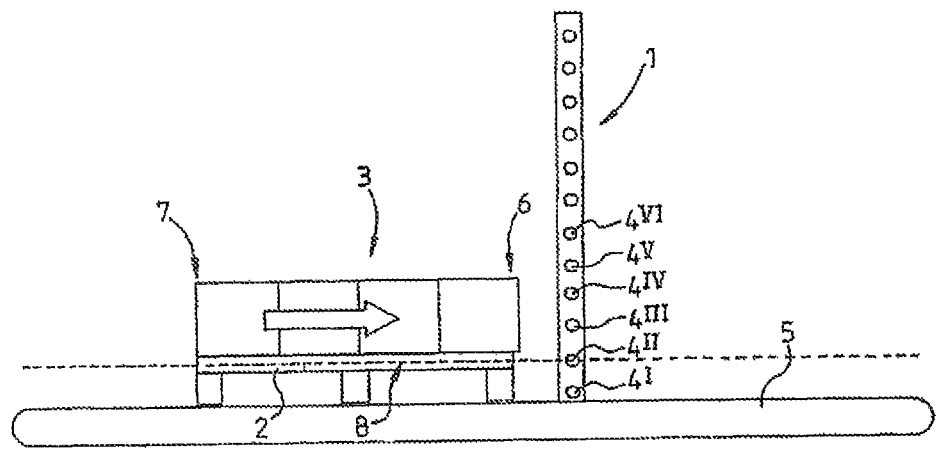

In a first embodiment, it is ensured that at least one light barrier $4^{II}$ is arranged at exactly the same height as a part 8 of the pallet 52 that extends from the beginning to the end of the pallet 52. This situation is represented in FIG. 6.

Although pallets in an automatic storing system are normally of the same type, this solution is possibly not adequate for certain situations. For example, if the pallet is damaged precisely at the location of the part that extends through the pallet. A second solution provides a light barrier with an obliquely extending light beam. With this feature and the additional, horizontally extending light beams, a greater light barrier density is produced, whereby the reliability of the detection of a pallet increases.

An obliquely extending light beam for the first group of light barriers, extending obliquely in the schematic front view, is represented in FIG. 7. The figure shows the situation in FIG. 5 at the time $t_5$, only parts 6 being depicted in the sectional view of the pallet 52. Three beams of light barriers are shown ($b^I$, $b^{II}$, $b^{III}$). The straight or horizontally extending beams $b^I$, $b^{II}$ pass by the parts 8, whereas the oblique beam $b^{III}$ impinges on the parts 8 and is interrupted. A corresponding detecting operation can be activated, for example by means of a configuration element.

In a third solution, the signals of the two groups of light barriers are recorded and processed later. This is often possible without problems occurring, since it is not normally important for a pallet to be stopped immediately after running through the light barrier apparatus 1. A distance of several centimeters to several meters is often acceptable without any problem.

Figure 10:
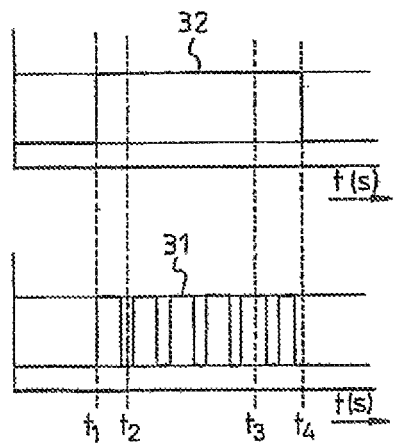
Figure 11:
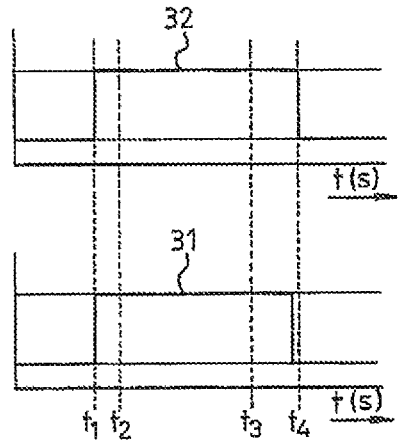

The processing of the recorded signals of FIG. 5 is explained on the basis of FIGS. 10 and 11.

The signals in FIG. 10 do not in fact show any overhang that would be great enough to require a corresponding output of the light barrier apparatus 1 to be activated at $t_1$ or $t_4$. However, the region at $t_2$ leads to the activation of the output. If the signal progressions are known, an algorithm can easily determine the front and rear edges of the pallet and of the load. The front edge at $t_1$ clearly shows that there is no overhang. The rear edge at $t_4$ shows that there is indeed a small time difference, but it should be evident in comparison with a maximum permissible time difference that there is no problem of an overhang here either. Everything that happens between the front edge 6 and the rear edge 7 is in fact irrelevant for the determination of an overhang and can therefore be ignored. As a result, the signal 31 of the first group of light barriers and the signal 32 of the second group of light barriers can be interpreted as in FIG. 11 and evaluated correspondingly.

Figure 8:
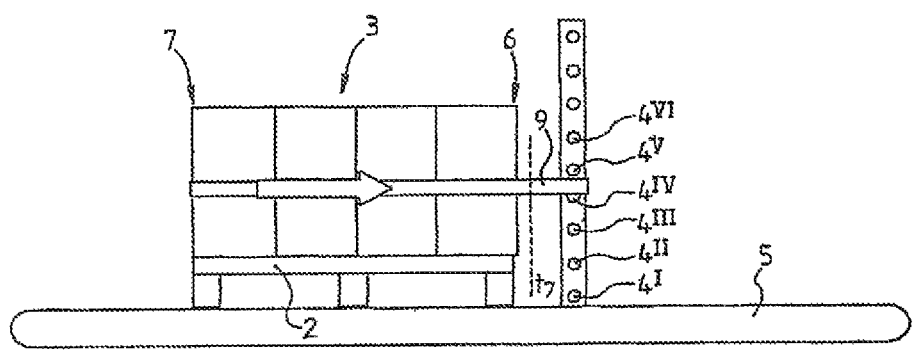
FIG. 8 shows a pallet with an overhang that reaches between a light barrier apparatus, in a schematic side view.
Figure 9:
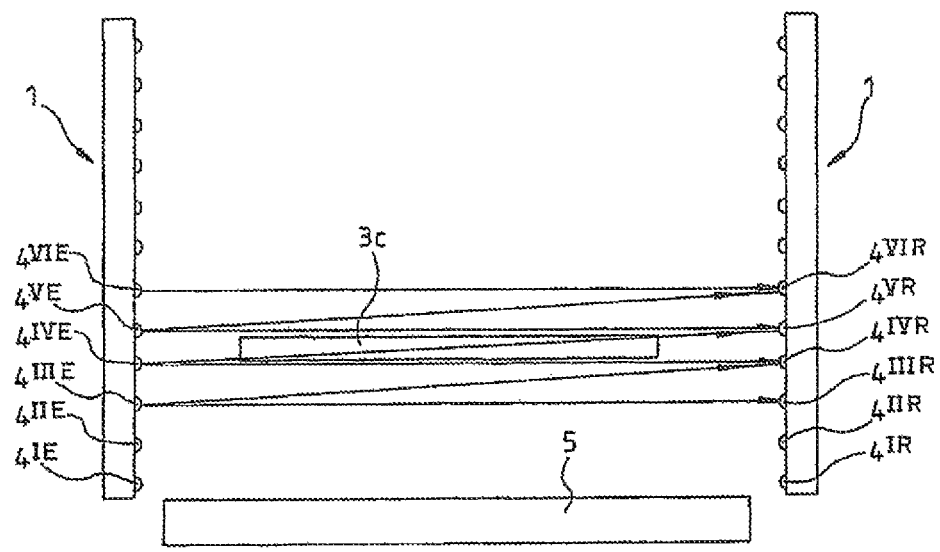
FIG. 9 shows an obliquely extending arrangement of light barriers of a light barrier apparatus for the detection of comparatively thin protruding load elements, in a schematic front view of FIG. 8, FIGS. 10 to 13 show signal progressions for groups of light barriers for the first and second regions.

A further situation that can cause problems is presented in FIG. 8. In this example, an item 9 of the load is thin enough not to be sensed by the parallel light barriers (see also FIG. 9). In a way corresponding to that represented in FIG. 7, where an oblique light barrier mode is used for the first group of light barriers, an oblique light barrier mode may also be used for the second group of light barriers. The oblique light barrier mode leads to a higher resolution within the fixed group of light barriers and has greater reliability in the detection of load items 3c, as represented in FIG. 9.

It should be noted that an oblique light beam should not extend from the first group of light barriers to the second group of light barriers, since then it is no longer possible to distinguish between the load 3 and the pallet 2. It is further a finding of the invention, that obliquely aligned light barriers should only belong to one group. It should also be noted that normally not all light barriers are read simultaneously. In theory, this may mean that the light barriers of the first group have been read but the pallet has to be moved a little further to read the light barriers of the second group. This may mean, for example, that the light barriers of the first group do not detect an interruption, whereas the light barriers of the second group are now in the load and interrupted even though there is no overhang.

To avoid such situations, there are once again a number of possible embodiments.

A first possibility is always to scan through a certain group of light barriers first. For the front edge of the pallet, for example, a second group of light barriers may always be read first. This ensures that, provided that no overhang is present, there is never a situation where the load is detected but the pallet is not. Correspondingly, for the rear edge, the first group of light barriers should be read first.

A second possibility is that the light barriers are once again completely read before an output signal is activated. For example, the light barriers are read twice and then the second "scan" subsequently checks whether or not it coincides with the first "scan" of the light barriers. Only then is the output activated or not activated.

Many factors (for example speed of the pallet, reading speed, position of the light barriers) determine whether or not an overhang is reliably detected.

In the case of a further exemplary embodiment, the light barriers are repeatedly read. The number of successive reading cycles must show the same result before the output is activated or can be set, for example by means of the configuration element.

A side effect of this refinement is an increase in accuracy and makes detection of the smallest overhang possible. In many cases, however, a small overhang may be accepted.

There are various possible ways of designing the system so as not to detect a given overhang of a certain size or not to allow an overhang that is any greater.

Figure 12:
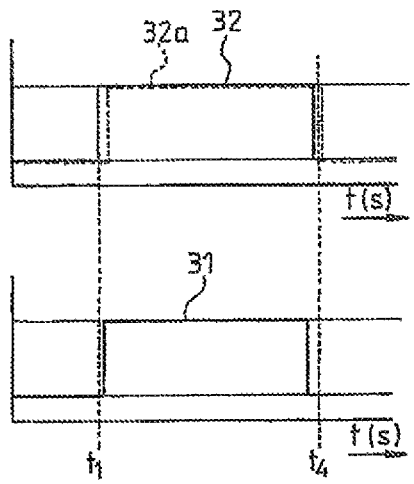

In the situation represented in FIG. 12, the output is activated on the basis of the presence of an overhang at $t_1$, since the first group of light barriers does not produce an interruption signal 31, but the second group of light barriers has a signal progression 32 that signifies the detection of a load, consequently signifies an overhang.

In many cases, however, precisely this minimal overhang that results from the comparatively small time difference from $t_1$ in FIG. 12 to the rising edge of the signal 31 is entirely tolerated.

Figure 13:
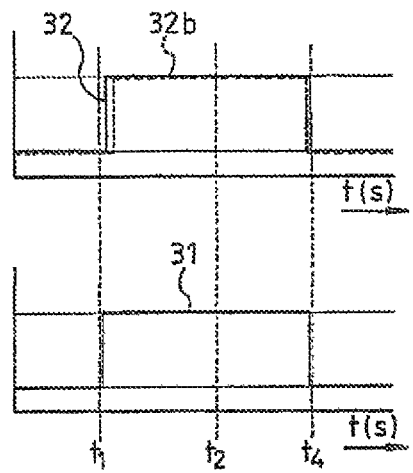

In the case of an advantageous refinement of the invention, the signal 32 is shifted in time, so that the dotted signal progression 32a is obtained. At the front edge, the problem is clearly solved as a result. At the rear edge, however, this produces an overhang that is not present, because the output signal is activated at $t_4$. In order to overcome this problem, the time shift may be allowed to take place only for a given time, for example up to $t_2$ (see FIG. 13). After the time $t_2$, the signal of the second group of light barriers may be set back in precisely the other direction, whereby the dotted signal progression 32b in FIG. 13 is obtained. The location $t_2$ may, for example, be arbitrarily chosen and lie between the front edge and the rear edge.

Another possible way of producing a time shift is that of geometrically offsetting the at least one light barrier from a group of light barriers. Three possible variants of an embodiment are represented in FIGS. 14 to 16. In FIG. 14, the light barriers $4^I$ and $4^{II}$ are offset counter to the direction of movement of a pallet. As a result, the signals of the light barriers $4^I$ and $4^{II}$ are shifted in time in relation to the other light barriers. Since the shift more or less corresponds to the tolerable overhang, such a way of realizing it is comparatively simple to apply. FIG. 15 shows a corresponding solution, but with the offset of merely one light barrier $4^I$.

Since the offset produces a time shift in one direction, this can lead to problems at the rear edge of a pallet with a load. This is because, even if there is no overhang, the time shift reduced by the geometrical offset can activate the "overhang present" output.

This can be prevented if it is considered whether the light barrier apparatus is detecting a front edge 6 or a rear edge 7. A refinement which, as a version that has been developed further, can distinguish between a front edge 6 and a rear edge 7 is represented in FIG. 16. The light barrier $4^I$ deals with the front side, whereas the light barrier $4^{III}$ is used for the rear side. The time difference of the signals of the light barriers $4^I$ and $4^{III}$ and their distance $\Delta x$ can additionally be used to determine the speed of a pallet. In this way, the size of an overhang can also be calculated and compared with given values of a configuration element. The light barrier $4^{II}$ in FIG. 16 can be used to establish whether the light barrier apparatus is monitoring the front edge or rear edge of an object. If the light barriers $4^I$ and $4^{II}$ are blocked and the light barrier $4^{III}$ is not blocked, the detection is of the front edge. If, on the other hand, the light barriers $4^{III}$ and $4^{II}$ are blocked and $4^I$ is not blocked, a rear edge must be present.

In the case of a further preferred refinement of the invention, the detection system comprises a further output for the height of the load. The height can be output continuously, when a light barrier has been interrupted, on request or only when no overhang is sensed.

A further refinement of the invention is represented in FIG. 17. Here, a 3D camera 171 is used to check the load, as represented in FIG. 17, for example the front edge of the load of a first pallet 172 and the rear edge of the load of a second pallet 173.

The camera may be formed, for example, as a stereo camera and perform transit time measurements or be based on the "time-of-flight principle", in which an oscillation is modulated onto an electromagnetic radiation, for example a light signal, wherein the emitted signal is compared with a returning signal and the distance from the reflection surface can be determined from the phase difference of the modulated oscillation.

An advantage of such a refinement lies in the possibility of simultaneously checking the first and second regions. In addition, the signals can be used for determining parameters of the pallet and the load, for example the height, the width and the volume.

The invention claimed is:

1. A sensor apparatus for detecting a load on a carrier device, comprising:
a three dimensional camera including at least one transmitter and at least one receiver, and
an electronic unit for controlling the transmitter and receiver, the electronic unit configured to:
modulate an oscillation onto an electromagnetic radiation emitted from the transmitter, wherein the radiation and the oscillation are transmitted across a first region and across a second region, wherein the second region is separate from the first region,
enable the receiver to detect the radiation and the oscillation reflected from a first object present in the first region and from a second object present in the second region,
generate a first signal corresponding to a phase shift of the oscillation detected in the reflected radiation from the first region with respect to the oscillation modulated onto the radiation in the transmitter;
generate a second signal corresponding to a phase shift of the oscillation detected in the reflected radiation from the second region with respect to the oscillation modulated onto the radiation in the transmitter, wherein the first region corresponds to the carrier device and the second region corresponds to the load; and
compare the first and the second signals to evaluate the geometrical position of the carrier in the first region with respect to the geometrical position of the load in the second region.

2. The sensor apparatus of claim 1, wherein the electronic unit ascertains an overhanging condition by performing a logical linking operation, wherein the overhanging condition is detected if the first signal signifies the absence of the carrier device and the second signal signifies the presence of the load.

3. The sensor apparatus of claim 1, wherein a movement speed of the carrier device is known and an overhanging condition is determined by the electronic unit from a difference between a time that the first signal is generated and a time that the second signal is generated.

4. The sensor apparatus of claim 1, wherein the electronic unit first senses the second region and then senses the first region.

5. The sensor apparatus of claim 1, wherein the first and second regions are sensed in tandem.

6. The sensor apparatus of claim 1, wherein the electronic unit generates the first and the second signals at least twice.

7. The sensor apparatus of claim 1, wherein the electronic unit generates the first and the second signals shifted in time in relation to one another.

8. The sensor apparatus of claim 7, wherein the first and the second signals are shifted in time depending upon whether an arriving front or departing front of the moving carrier device with the load is being detected.

9. The sensor apparatus of claim 1, wherein:
the first signal has at least a first state, indicating the presence of the carrier, and a second state, indicating the absence of the carrier, and
the second signal has at least a first state, indicating the presence of the load, and a second state, indicating the absence of the load.

10. A time-of-flight sensor apparatus for detecting a load on a carrier device, comprising:
a transmitter configured to emit radiation across a first region and across a second region, were the second region is separate from the first region;
a receiver configured to detect the radiation transmitted across each of the first region and the second region; and
an electronic unit configured to:
control the transmitter and the receiver,
generate a first signal corresponding to the radiation detected from the first region, wherein the first region corresponds to the carrier device,
generate a second signal corresponding to the radiation detected from the second region, wherein the second region corresponds to the load, and
compare the first and the second signals to evaluate the geometrical position of the carrier in the first region with respect to the geometrical position of the load in the second region.

11. The sensor apparatus of claim 10, wherein the electronic unit is further configured to:
generate the first signal as a function of a phase shift between the radiation detected from the first region and the radiation transmitted across the first region, and
generate the second signal as a function of a phase shift between the radiation detected from the second region and the radiation transmitted across the second region.

12. The sensor apparatus of claim 10, wherein:
the first signal has at least a first state, indicating the presence of the carrier, and a second state, indicating the absence of the carrier; and
the second signal has at least a first state, indicating the presence of the load, and a second state, indicating the absence of the load.

13. The sensor apparatus of claim 12 wherein the electronic control unit is configured to ascertain whether the load is overhanging the carrier device when the first signal indicates the absence of the carrier and the second signal indicates the presence of the load.

14. The sensor apparatus of claim 12, wherein the electronic unit ascertains an overhanging condition by performing a logical linking operation, wherein the overhanging condition is detected if the first signal signifies the absence of the carrier device and the second signal signifies the presence of the load.

15. The sensor apparatus of claim 10, wherein the transmitter is further configured to emit the radiation across the first region first and across the second region simultaneously.

16. The sensor apparatus of claim 10 wherein the electronic unit is further configured to independently sense the first region and the second region during movement of the carrier device.

17. The sensor apparatus of claim 16, wherein the electronic unit first senses the second region and then senses the first region.

* * * * *